UNITED STATES PATENT OFFICE.

WILLARD E. CASE, OF AUBURN, NEW YORK.

PROCESS OF MAKING ALUMINUM COMPOUNDS.

SPECIFICATION forming part of Letters Patent No. 512,803, dated January 16, 1894.

Application filed March 13, 1893. Serial No. 465,810. (No specimens.)

*To all whom it may concern:*

Be it known that I, WILLARD E. CASE, of the city of Auburn, New York, have invented certain new and useful Improvements in Processes for the Manufacture of Aluminum Compounds, of which the following is a specification.

The object of my invention is to produce an aluminum compound which from its constitution and physical properties is capable of many uses in the arts.

I produce this aluminum compound by the following process: I dissolve aluminum sulfate in water and add thereto calcium fluorid, preferably heating the solution to a temperature of 180° Fahrenheit, in order to expedite the reaction, and preferably maintaining it at this temperature for several hours. On account of its cheapness, I prefer to use ground fluorspar for this purpose.

The reaction which takes place may probably be represented by the following equation:

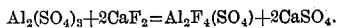

$$Al_2(SO_4)_3 + 2CaF_2 = Al_2F_4(SO_4) + 2CaSO_4.$$

I next separate, by filtration or otherwise, the precipitated calcium sulfate, (together with such excess of calcium fluorid as remains undecomposed,) from the resulting fluo-sulfate solution. For the next step I prefer to have the solution at a specific gravity of about 1.040, and at about the normal temperature. I next prepare an aqueous solution of a caustic alkali, as ammonium hydrate, potassium hydrate, or sodium hydrate, and for convenience simply I prefer to use a saturated solution. If iron is present,—for, if the aluminum sulfate and calcium fluorid are of the usual commercial qualities they may either of them contain iron as an impurity,—I proceed to remove such iron by the following operation: I add the caustic alkali solution to the fluo sulfate solution, (which precipitates the iron,) until upon removing, filtering, and testing a small sample of this solution with potassium ferrocyanide it shows itself substantially free from iron in the ferric form; and then by filtration or otherwise, I remove the iron precipitate. The caustic alkali solution is now added to the fluo sulfate solution until it ceases to bring down a further quantity of a white precipitate, which I prefer to remove at once from said solution by filtration or otherwise. This white precipitate is rich in aluminum and free from such iron as may have been present in a crude aluminum sulfate, if such has been used. This product is of particular value as a source of aluminum to be extracted by electrolysis or otherwise, and its physical qualities render it useful for other purposes.

I claim—

1. The process herein described for making an insoluble aluminum compound, which consists in combining aluminum sulfate and calcium fluorid to form an aluminum fluo sulfate solution, and adding thereto a caustic alkali.

2. The process herein described of removing the iron and making an insoluble aluminum compound, from an aluminum fluo sulfate solution, which consists in first adding to said solution a caustic alkali to precipitate the iron, removing said iron, and then adding to said solution a further quantity of said caustic alkali to cause precipitation of said aluminum compound.

3. The process herein described of making an insoluble aluminum compound, which consists in combining aluminum sulfate and calcium fluorid to form an aluminum fluo sulfate solution, and adding thereto ammonium hydrate.

4. The process herein described of removing the iron and making an insoluble aluminum compound, from an aluminum fluo sulfate solution, which consists in first adding to said solution ammonium hydrate to precipitate the iron, removing said iron, and then adding to said solution a further quantity of ammonium hydrate to cause precipitation of said aluminum compound.

WILLARD E. CASE.

Witnesses:
 FREDERICK I. ALLEN,
 JNO. VAN SICKLE.